Patented Nov. 22, 1927.

1,650,139

UNITED STATES PATENT OFFICE.

CARL KRAUHS, OF LEVERKUSEN, NEAR COLOGNE, GERMANY, ASSIGNOR TO GRASSELLI DYESTUFF CORPORATION, OF NEW YORK, N. Y., A CORPORATION OF DELAWARE.

VAT DYESTUFF OF THE ISATINE OXYTHIONAPHTHENE GROUP.

No Drawing. Application filed January 5, 1926, Serial No. 79,472, and in Germany January 8, 1925.

The unsubstituted isatine obtained from aniline when condensed with oxythionaphthene yields a dyestuff which produces dyeings of pronounced red shades. Likewise, according to my determination, 6-methylisatine obtained from meta-toluidine and 5-methylisatine prepared from para-toluidine yield dyestuffs which produce pronounced red dyeings which vary very little from each other in shade.

I have now found in contrast to these substances that 7-methylisatine obtained from ortho-toluidine yields with oxythionaphthene a dyestuff which, surprisingly, produces an entirely different shade, namely, a very yellow-brown. In particular, it was unexpected that 5-methylisatine and 7-methylisatine combined with oxythionaphthene would produce color shades which differ from each other so completely.

This very surprising difference of shade manifests itself also in the further substituted 7-methylisatines. The dyestuff from 6-chlor-5-methylisatine and oxythionaphthene dyes a deep brownish Bordeaux; while on the other hand, the corresponding dyestuff from 6-chlor-7-methylisatine dyes an orange-like very yellow red.

These vat dyestuffs obtained by the coupling of 7-methylisatines with oxythionaphthenes are when dry yellow-brown to brown-red powders. They dissolve in concentrated sulfuric acid and yield blue to violet colored solutions. The color of their vat solutions is yellow.

The alpha-derivatives of 7-methylisatine also give a very surprising result when combined with oxythionaphthene. While 7-7'-dimethylindigo dyes a greener and duller color than does ordinary indigo, 7-methyl-2-indole-2'-thionaphtheneindigo yields redder and clearer shades than does 2-indole-2'-thionaphtheneindigo. Halogenated 2-indole-2'-thionaphtheneindigo dyes a rich greyish and dull violet. On the other hand, 7-methyl-indolethionaphtheneindigo halogenated in the same way yields violet colored dyeings of pronounced clearness.

Halogenated 7-methylindolethionaphthene-indigo in the dry state is a blue-violet powder. Its solution in concentrated sulfuric acid is greenish-blue and the color of its vat solution is yellow. It probably has the following constitutional formula:

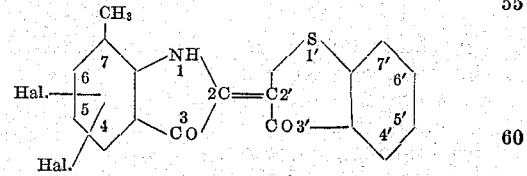

in which the position of the halogen atoms (Hal.) is not perfectly known.

Example 1.

7-methylisatine is made into a paste with a little water and coupled at about 80–90° C. with an aqueous solution of the sodium salt of oxythionaphthene-carboxylic acid in the presence of soda, so that at the end of the reaction a very small excess of the sodium salt of the carboxylic acid remains. The separated dyestuff is washed and dried. It dyes wool a yellow-brown. It has probably the formula

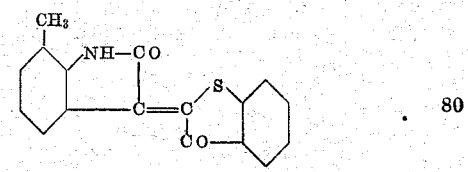

Example 2.

6-chlor-7-methylisatine obtained as in German Patent 277,396 granted July 13, 1914 to I. G. Farbenindustrie Aktiengesellschaft is combined with oxythionaphthene in the manner described in Example 1. The dyestuff produced dyes textile fibres yellow-red to orange shades. The dyeings are outstandingly fast. When dried the dyestuff is a brown-red powder. Its solution in sulfuric acid is violet colored and the color of its vat solution is yellow. It probably has the following constitutional formula

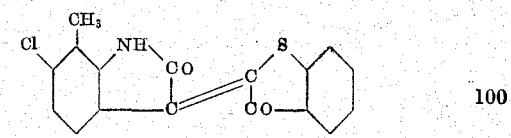

Example 3.

7-methylisatine-alpha-ortho-toluidine prepared by the method described in German Patent 277,396 is coupled with the sodium salt of oxythionaphthenecarboxylic acid at about 60°. The condensation product is filtered off, purified by further vat treatments, dried and subsequently brominated in the usual manner. The dyestuff produced dyes textile fibres beautiful clear violet shades of extraordinary fastness. It has most probably the formula

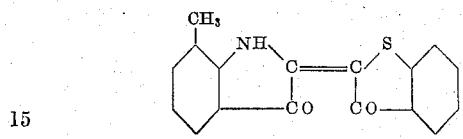

in which the position of the bromine atom is not perfectly known.

A further example of the striking differences in color manifested by the methylisatines is the difference between 5:7-dichlor-isantine-6-chlor-7-methyloxythionaphthene and 6-chlor-7-methylisatine-6-chlor-7-methyloxy-thio-naphthene. The former produces dark maroon-colored dyeings while the latter yields a very brownish-orange dyeing.

It is evident that the dyestuffs made according to this invention may be regarded as condensation products of 7-methylisatine;

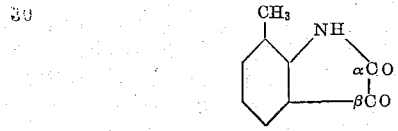

its derivatives substituted in the benzene nucleus; or their reactive alpha derivatives, and oxythionaphthene compounds;

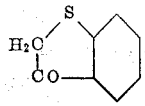

obtained by linking oxythionaphthene compounds with either the alpha or beta carbons of isatine, and the term "condensation products of 7-methylisatines and oxythionaphthenes" in the claims is intended to include all such condensation products which are derivatives of the 7-methylisatines.

I claim:

1. As new products, vat dyestuffs which are substantially identical with condensation products of 7-methylisatines and oxythionaphthenes.

2. As new products, vat dyestuffs which may be regarded as condensation products of halogenated 7-methylisatines and oxythionaphthenes.

3. As new products, vat dyestuffs which are substantially identical with condensation products of chlorinated 7-methylisatines and oxythionaphthenes.

4. A vat dyestuff which is the condensation product of 6-chlor-7-methylisatine and oxythionaphthene.

5. A vat dyestuff, which is substantially identical with the condensation product of 6-chlor-7-methylisatine and oxythionaphthene, which probably has the constitutional formula

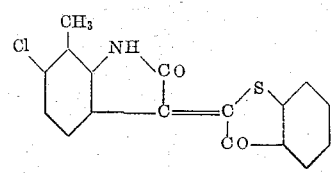

which in the dry state is a brown-red powder, which produces yellow-red to orange dyeings of extraordinary fastness on textile fibres and which yields a violet colored sulfuric acid solution and a yellow vat solution.

In testimony whereof, I affix my signature.

CARL KRAUHS.